United States Patent [19]

Perraud et al.

[11] Patent Number: 5,408,091
[45] Date of Patent: Apr. 18, 1995

[54] DEVICE FOR MEASURING A PHYSICAL QUANTITY BY TIME-DIVISION CODING

[75] Inventors: Eric Perraud; Jean-Paul Domergue; Stéphane Roulon, all of Toulouse, France

[73] Assignee: Societe Anonyme dite: Aerospatiale Societe Nationale Industrielle, Paris, France

[21] Appl. No.: 149,471

[22] Filed: Nov. 9, 1993

[30] Foreign Application Priority Data

Nov. 9, 1992 [FR] France .................................. 92 13464

[51] Int. Cl.⁶ .............................................. H01J 5/16
[52] U.S. Cl. ............................ 250/227.18; 250/227.23
[58] Field of Search ....................... 250/227.23, 227.28, 250/227.14, 227.18; 385/12, 13; 73/800, 804, 805

[56] References Cited

U.S. PATENT DOCUMENTS

| | | | |
|---|---|---|---|
| 4,529,875 | 7/1985 | Brogardh et al. | 250/227.23 |
| 4,947,038 | 8/1990 | Wiesmeier et al. | 250/227.23 |
| 4,964,727 | 10/1990 | Huggins | 356/373 |
| 4,999,489 | 3/1991 | Huggins | 250/227.23 |
| 5,191,208 | 3/1993 | Slemon et al. | 250/227.23 |

FOREIGN PATENT DOCUMENTS

| | | |
|---|---|---|
| 3820912 | 12/1989 | Germany . |
| 1540907 | 2/1979 | United Kingdom . |
| 2209101 | 4/1989 | United Kingdom . |
| 2236854 | 4/1991 | United Kingdom . |

*Primary Examiner*—David C. Nelms
*Assistant Examiner*—Que T. Le
*Attorney, Agent, or Firm*—Marshall, O'Toole, Gerstein, Murray & Borun

[57] ABSTRACT

A device for measuring a physical quantity by time-division coding includes a source (1) capable of generating light pulses; a coder (2), the position of which depends on the value of the physical quantity, a sensor (4) including apparatus (5) for sending the light pulses to the coder (2) and a receiver (6) for receiving the coded light pulses, and an analyzer (7) for analyzing the coded light pulses connected to the sensor. The source (1) is capable of generating light pulses simultaneously at two different wavelengths ($\lambda 1$, $\lambda 2$), and the sensor (4) is provided with apparatus (9a) for separating the light pulses on the basis of their wavelength, the light pulses at a first wavelength ($\lambda 1$) passing through the sensor (4) and being coded, while the light pulses at a second wavelength ($\lambda 2$) are returned to the analyzer (7) to constitute pulses for triggering the sensor.

22 Claims, 7 Drawing Sheets

DEVICE FOR MEASURING A PHYSICAL QUANTITY BY TIME-DIVISION CODING

The present invention relates to a device for measuring a physical quantity, with the aid of a sensor which can, in particular, be a fiber optic position sensor.

This device is more especially intended to be employed in the aeronautics sector. Indeed, the position sensors on an aircraft are installed within a harsh environment (vibrations, fluids, molds, electromagnetic disturbances) and require great sensitivity, especially around a particular value. However, the field of application of this device may extend to the monitoring of industrial processes involving moving elements (machine tools and assembly lines in particular), operating within harsh and/or dangerous environments. It goes without saying, moreover, that position is not the only physical quantity which can be measured with the device of the invention, as will be seen in more detail later.

Two types of position sensors, using optical fibers in particular, have been studied and developed: on the one hand, sensors with intra-spectrum coding and, on the other hand, sensors with time-division coding.

The first solution is advantageous for reasons of compactness and because it uses reliable and inexpensive components of the light-emitting diode type. However, it is difficult to integrate a device of this type into a network for the following reasons. On the one hand, it occupies the entire spectral window of the optical fiber, thus excluding any form of chromatic multiplexing. On the other hand, since the CCD strip used in this device has an electrode current averaging time of the order of 10 ms, the time-division multiplexing of such sensors would assume the sensors to be separated from one another by a prohibitive distance. In the case in which the use of an array of sensors is envisaged, it is thus appropriate to resort to the time-division coding solution.

Thus, for example, document FR-A-2 610 465 describes a device for measuring a physical quantity by time-division coding, comprising:

a source capable of generating light pulses;

means of coding, the position of which depends on the value of said physical quantity;

first means of transmitting said light pulses from said source to at least one sensor;

said sensor comprising means for sending said light pulses to said coding means, arranged at the end of said first transmission means opposite said coding means, and means of receiving the coded light pulses; and means of analyzing the coded light pulses, connected to said sensor by second transmission means.

In this case, the sensor includes a span of optical fiber of specified length between an intermediate connector, producing a reference pulse by reflection, and the responsive element of the sensor producing a measuring pulse, which is thus distanced from the reference pulse by an elementary time interval, the reference and measuring pulses being transmitted by the same optical fiber at the same wavelength. The analysis means detect the operating state of the sensor, conditioned by the presence or absence of said reference pulse in the signals which they receive.

However, using a single wavelength for the reference and measuring pulses runs the risk of confusing them at the level of the analysis means, for example in the case in which the time-shifting of these pulses might be affected for any reason, so that the reference pulse can no longer be detected from among the set of signals received by the analysis means.

The object of the present invention is to avoid this disadvantage, and relates to a device for measuring a physical quantity by time-division coding, which is simple, reliable and which allows extremely accurate triggering of the acquisition of the responses from the sensor while avoiding any risk of error.

To this end, the device for measuring a physical quantity by time-division coding, of the type described above, is notable, according to the invention, in that said source is capable of generating light pulses simultaneously at least two different wavelengths, and in that the sensor is associated with first means of separating the light pulses on the basis of their wavelength, arranged upstream of said sending and receiving means, the light pulses at a first wavelength passing through said sensor and being coded before being returned to the analysis means, while the light pulses at a second wavelength are returned to the analysis means before reaching the coding means for the purpose of constituting pulses for triggering the sensor.

Thus, the analysis means receive, in a first phase, a pulse at the second wavelength, this making it possible to trigger in a synchronized manner the acquisition of the sequence of coded pulses at the first wavelength, originating from the sensor. The pulse at the second wavelength therefore serves as message synchronization signal, thereby avoiding any risk of confusion between the triggering signals and the measuring signals.

Advantageously, said first and second transmission means consist of optical fibers.

Preferably, said means for sending and for receiving the light pulses consist of a plurality of pairs of individual elements for sending and for receiving, the elements of each pair being arranged opposite one another and on either side, respectively, of said coding means, and being connected to said first transmission means by delay lines via a coupler.

In a first case, the individual receiving elements are adapted to reflect the coded light pulses and return them to the analysis means through the corresponding sending elements.

In this case, said first means for separating the light pulses on the basis of their wavelength advantageously consist of a filter allowing through the light pulses at the first wavelength, but reflecting the light pulses at the second wavelength towards the analysis means.

In a second case, the individual receiving elements are adapted to transmit the coded light pulses to the analysis means via said second transmission means.

In the latter case, said first means for separating the light pulses on the basis of their wavelength consist of means for diverting the light pulses at the second wavelength between the input and the output of the sensor.

Preferably, the diverting means comprise a wavelength-division demultiplexer, stationed at the input of the sensor and an output of which delivers the pulses at the first wavelength passing through the sensor and the other output of which, delivering the pulses at the second wavelength, is connected to an input of a wavelength-division multiplexer receiving, at its other input, the coded pulses at the first wavelength.

When sensors of this type are connected in an array and are polled by time-division multiplexing, it is necessary to solve the problems of managing this array and more especially of managing the acquisitions of the responses of the sensors.

According to a conventional design, acquisition of the responses of the sensors assumes that the topology of the array is fully known to the analysis means, either by construction, as is particularly the case for digital sensors marketed by the TELEDYNE RYAN Company, or by electronic learning, as is the case for example with the OPTONET array from the PHOTONETICS Company. The analysis means must indeed know very accurately the instants at which the responses from the sensors arrive at their photodetectors.

Thus, any action which modifies for example the length of the optical information transmission fibers disturbs acquisition of the data originating from the sensors.

This is why, in order to avoid these disadvantages, a device such as that defined earlier, including an array of a plurality of sensors, is notable, according to the invention, in that the said source is capable of generating light pulses at a third wavelength, and in that second means of separating the light pulses on the basis of their wavelength are provided, upstream of said sensors, in order to return the light pulses at the third wavelength to said analysis means for the purpose of constituting pulses for triggering the array and allowing through the light pulses at the first two wavelengths.

In a first case, in which the sensors of the device operate by reflection, the plurality of sensors are connected in parallel to the outputs of a coupler via delay lines, and said coupler is associated with a filter for reflecting the pulses at the third wavelength, constituting said second separating means.

In a second case, in which the sensors of the device operate by transmission, the plurality of sensors are connected in parallel between an input distribution coupler via delay lines and an output mixing coupler, said couplers being associated with means for diverting the light pulses at the third wavelength between the input of the distribution coupler and the output of the mixing coupler, constituting said second separating means.

Preferably, in the latter case, said diverting means comprise a wavelength demultiplexer, at the input of the distribution coupler, an output of which delivers the light pulses at the first two wavelengths to said distribution coupler, and another output of which, delivering the light pulses at the third wavelength, is connected, downstream of the mixing coupler, to an input of a wavelength-division multiplexer receiving at another input the coded light pulses and the light pulses for triggering the sensors, delivered by the mixing coupler.

Moreover, the source capable of generating light pulses comprises multimode laser diodes.

Advantageously, the source capable of generating light pulses and the analysis means are associated, respectively, with means for multiplexing and with means for demultiplexing the light pulses at the various wavelengths.

Furthermore, the analysis means are capable of locating a fault in the device by monitoring the presence or absence of triggering pulses.

Moreover, each sensor may be a position or displacement sensor.

In the known sensors, the coding means take the form of a plate having regions which are or are not successively reflective, making it possible to generate a sequence of coded pulses as a function of the position of the plate with respect to means for sending and for receiving light pulses. However, this structure has a number of disadvantages in respect of protection against attack from the environment since it is in particular very sensitive to the presence of dust. Furthermore, if the plate deforms and no longer lies in a plane perpendicular to the sending and receiving means, for example following incorrect assembly or mechanical wear of the parts, the amplitude of the reflected pulses, and therefore the binary error rate on each detection channel, are affected.

To avoid these disadvantages, according to the invention, the coding means stationed between said sending means and said receiving means consist of a mask containing regions which are opaque and regions which are transparent to said light pulses, said regions being arranged in a specified coding configuration.

Advantageously, said mask includes position coding tracks and parity coding tracks, each including opaque regions and transparent regions.

Moreover, the coding configuration may be a binary code configuration or else a GRAY code configuration. Similarly, the coding configuration may exhibit uniform quantization or else logarithmic quantization.

The figures of the attached drawing will elucidate the manner in which the invention may be embodied, in these figures, identical labels denote similar elements.

BRIEF DESCRIPTION OF THE DRAWINGS

FIG. 2 shows, in further detail, an illustrative device according to the invention, in accordance with FIG. 1a.

Figure 1A:
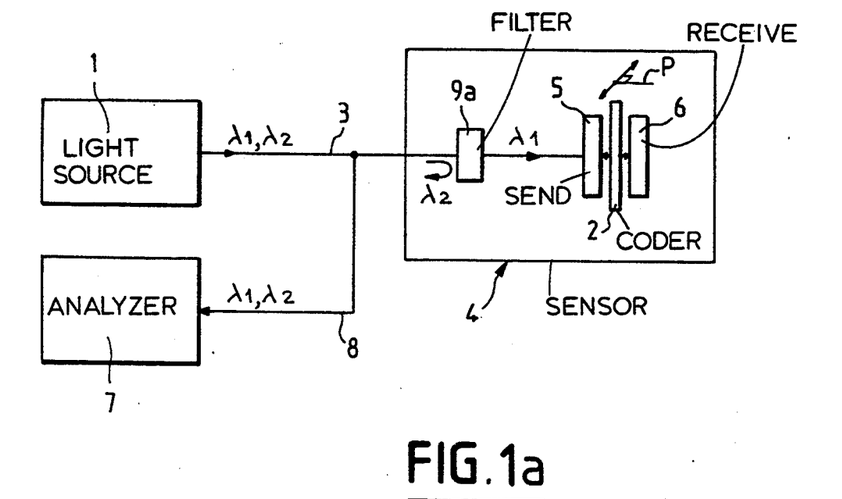
FIG. 1a is a much simplified schematic diagram of a first illustrative embodiment of the device for measuring a physical quantity according to the invention, operating by reflection.
Figure 1B:
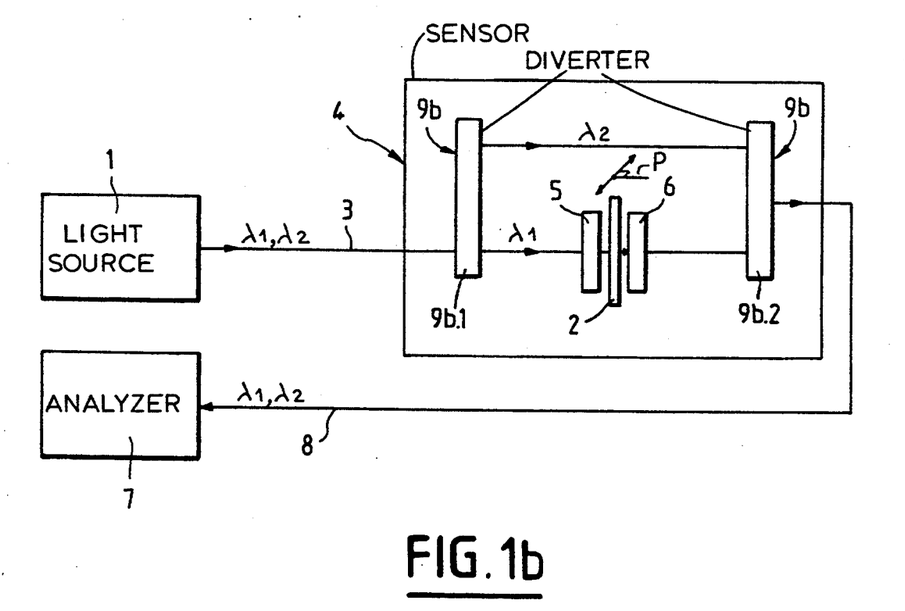
FIG. 1b is a much simplified schematic diagram of a second illustrative embodiment of the device for measuring a physical quantity according to the invention, operating by transmission.

FIGS. 1a and 1b illustrate very schematically first and second illustrative embodiments of the measuring device according to the invention, the sensor of which operates by reflection and by transmission respectively.

In these figures, the device for measuring a physical quantity by time-division coding generally comprises a source 1 capable of generating light pulses simultaneously at two different wavelengths $\lambda 1$, $\lambda 2$, coding means 2, the position of which depends on the value of said physical quantity (displacement of the coding means may be effected in a plane P perpendicular to the plane of FIGS. 1a, 1b, or else the coding means may effect a rotation upon themselves in this plane P), means of transmission 3 (consisting in particular of an optical fiber) of the light pulses from the source 1 to a sensor 4, which comprises means 5 for sending the light pulses to the coding means 2, arranged at the end of the transmission means 3 opposite said coding means 2, and means 6 for receiving the coded light pulses. It will be noted in this regard that, although it is possible to use, as coding means, a mask in the form of a plate having successive regions which are or are not reflective, the coding means employed within the scope of this invention have regions which are or are not transparent to light pulses, patterned according to a certain code, so that the arrangement shown in FIGS. 1a and 1b and the following figures is obtained, in which the sending means 5 and the receiving means 6 are stationed either side of the coding means 2. Moreover, the device comprises means 7 for analyzing the coded light pulses, connected to the sensor 5 by a link 8, in particular by optical fiber, and means 9a, 9b for separating the light pulses on the basis of their wavelength $\lambda 1$ or $\lambda 2$, arranged upstream, in the direction of propagation of the light pulses, from the sending 5 and receiving 6 means, the light pulses at a first wavelength $\lambda 1$ passing through the sensor 4 and being coded before being returned to the analysis means 7, while the light pulses at a second wavelength $\lambda 2$ are returned to the analysis means 7 without passing through the coder 2 for the purpose of constituting pulses for triggering the sensor.

The separating means can consist of a filter 9a (FIG. 1a) or of a diverter 9b (FIG. 1b), as will be seen in further detail later.

Figure 2:
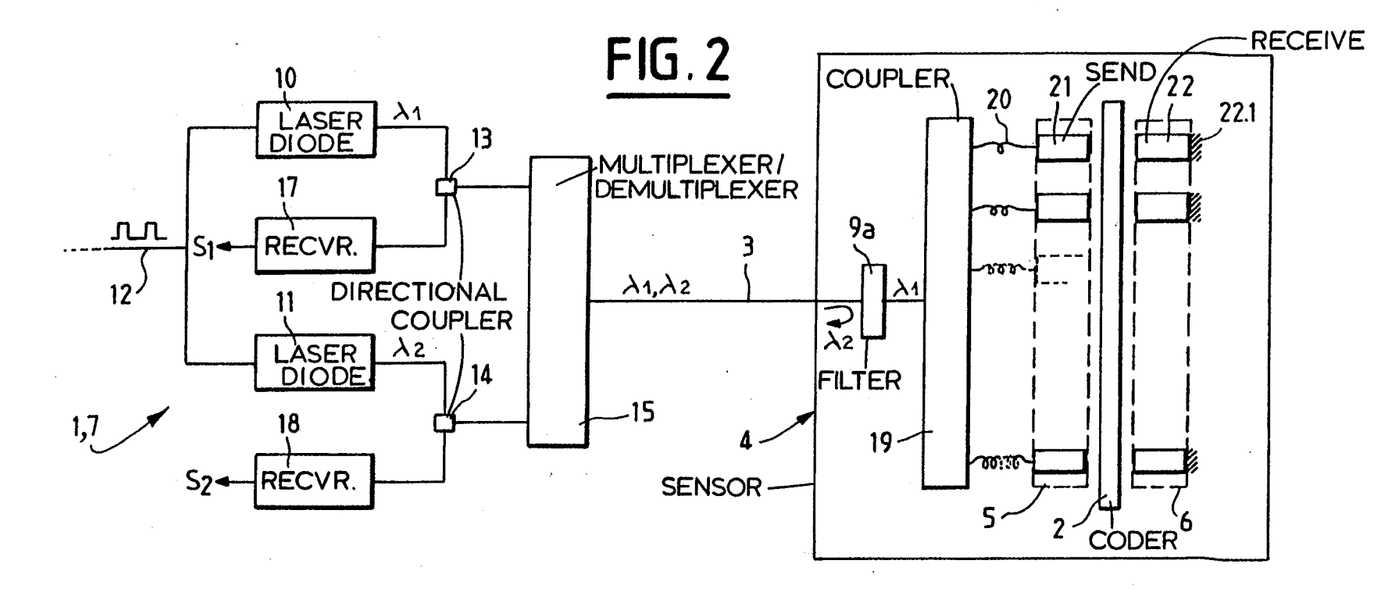

FIG. 2 shows, in further detail, an illustrative device according to the invention, in accordance with FIG. 1a.

In this figure, two laser diodes 10 and 11 emitting light pulses at two different wavelengths $\lambda 1$ and $\lambda 2$ (for example 0.85 micrometers and 1.3 micrometers) are connected to an electrical power supply (not shown) by the link 12, and constitute the source 1 mentioned earlier. These diodes are driven by a pulsatile signal, while the light pulses emitted are applied to the ports of directional couplers 13 and 14 respectively, themselves connected to a wavelength multiplexer/demultiplexer 15. Another port of each of the directional couplers 13 and 14 is connected to receivers 17 and 18 respectively, the outputs of which are connected to the analysis means proper (not shown in this figure).

Moreover, the multiplexer/demultiplexer 15 is connected, by an optical fiber 3, to the interference filter 9a for reflecting the pulses at the second wavelength $\lambda 2$ into the fiber 3. The pulses at the first wavelength $\lambda 1$ are directed towards the sensor 4, comprising, in this case, a star coupler 19 linked, via delay lines 20 (optical fibers of different lengths), to a plurality of individual sending elements 21 stationed opposite the coder 2 and facing individual receiving elements 22.

It is recalled that the device illustrated in this figure includes a sensor 4 operating by reflection, that is to say it receives pulses from the source and returns a sequence of corresponding coded pulses via the same optical fiber 3. To do this, the individual receiving elements 22 must be elements which reflect at said first wavelength (for example $\lambda 1 = 0.85$ micrometers), and may each consist of a graded index lens having a reflective surface 22.1. Similarly, the individual sending elements 21 may each consist of a graded index lens.

Figure 3A:
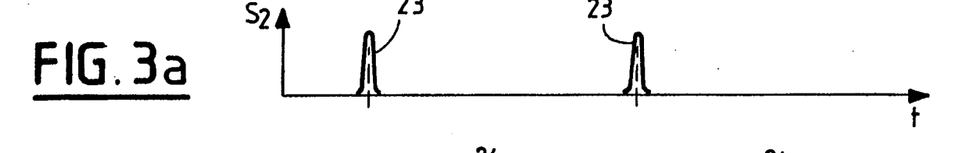
FIGS. 3a and 3b are timing diagrams showing, respectively, the triggering signals and measuring signals obtained by implementing the device of FIG. 2.
Figure 3B:
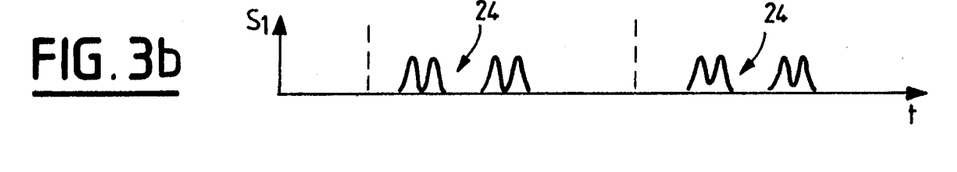

Thus, as already indicated, the analysis means connected to the receivers 17 and 18 receive, in a first phase, a pulse for triggering the sensor at the second wavelength $\lambda 2$, this allowing very accurate triggering of acquisition of the sequence of coded pulses at the first wavelength $\lambda 1$, originating from the sensor. The pulse at the second wavelength $\lambda 2$ therefore serves as message synchronization signal. This is illustrated in FIGS. 3a and 3b which are timing diagrams showing, respectively, the triggering signals 23 and the measuring signals 24 obtained by employing the device of FIG. 2. It will be noted that, in these timing diagrams as well as in those that follow, the spurious signals (due to reflections from the optical connectors) have deliberately been omitted for reasons of clarity in these figures. In any event, such spurious signals definitely cannot be confused with either the triggering signals or the measuring signals.

The minimum difference in the length of the delay lines depends on the duration of the emitted pulse. In order to reduce the length of the lines and consequently the proportions of the sensor, short-duration pulses compatible with the pass band of the fiber should be generated. For pulses having a width of 10 ns, the progression of each line will be at least 1 meter for a sensor operating in reflection. To minimize the proportions of the sensor, they may be wound around a cylinder whose diameter is sufficiently large not to generate variations in amplitude of the pulses in each line.

Moreover, the number of lines depends on the accuracy desired. However, the resolution of such a sensor, in the role of linear position sensor, is limited by the size of the spot at the exit of the graded index lens, namely less than 0.5 mm. This minimum detectable variation can, however, be reduced by not placing the end of the fiber in the focal plane of the lens, that is to say against its entrance face, but slightly offset from the latter. Thus, when using fibers with a 50 micrometer core diameter, the resolution may be of the order of 100 micrometers (50 micrometers if the lenses were perfect).

Furthermore, the laser diodes will preferably be multimode diodes so as to avoid modal noise, while, to prevent any risk of saturating the detector, a sensor operating by transmission, or a "two-fiber" sensor may be used. In the case in which the device according to the invention includes a sensor operating by transmission (FIG. 1b), the means 9b of separating the light pulses on the basis of their wavelength constitute a diversion which can include a wavelength demultiplexer 9b.1, stationed at the input of the sensor 4 and an output of which delivers pulses at the first wavelength $\lambda 1$ passing through the sensor and whose other output, delivering the pulses at the second wavelength $\lambda 2$, is connected (by an optical fiber) to an input of a wavelength-division multiplexer 9b.1 receiving, at its other input, the coded pulses at the first wavelength $\lambda 1$. In this case, the multiplexer 9b.2 is connected to the analysis means 7 by the link 8 (optical fiber). The sensor operating in transmission allows a saving of about 7 dB owing to the absence of the sending/receiving coupler, but the length of each channel will be twice as great as for a sensor operating by reflection.

Figure 4:
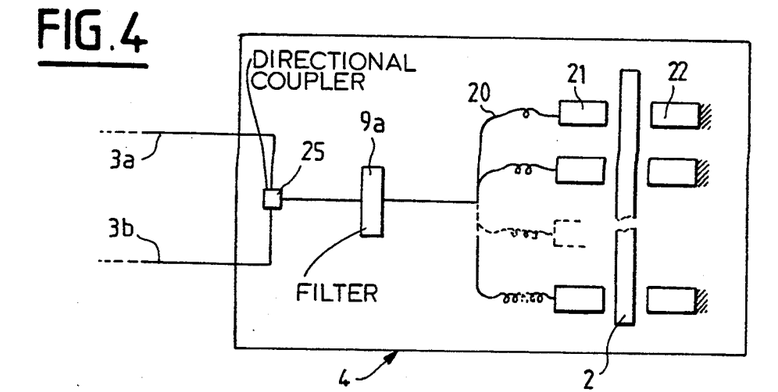
FIG. 4 shows a detail of a variant embodiment of the device according to FIG. 2.

FIG. 4 shows a detail of a variant embodiment of the device according to FIG. 2, in which only the portion of the device comprising the sensor of the "two-fiber" type has been shown. In this case, a first input fiber 3a is used, connected to a port of a directional coupler 25, another port of which is connected to a second output fiber 3b.

Figure 5:
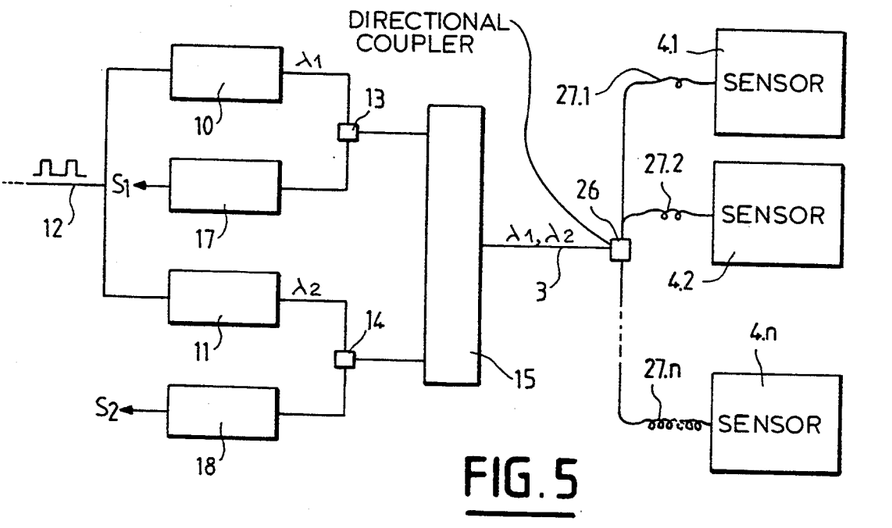
FIG. 5 shows, very schematically, the adapting of the device according to the invention to an array of sensors operating by reflection.

FIG. 5 shows, very schematically, the adapting of the device according to the invention to an array of n sensors. In this case, the optical fiber 3 is connected to a port of a directional coupler 26, the other ports of which are connected, by delay lines 27.1 to 27.n, to the respective sensors 4.1 to 4.n.

Figure 6A:
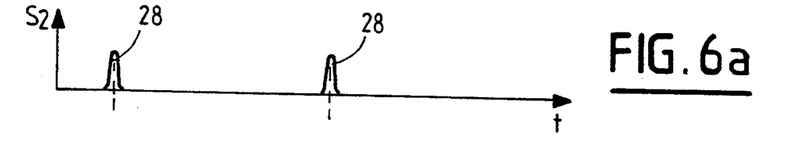
FIGS. 6a and 6b are timing diagrams showing, respectively, the triggering signals and measuring signals obtained by implementing the device of FIG. 5.
Figure 6B:
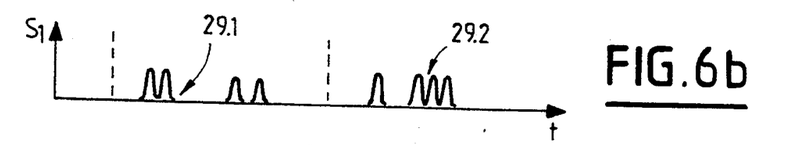

Acquisition of the data 29.1, 29.2, . . . (FIG. 6b) is triggered as soon as a synchronization pip 28 (FIG. 6a) is detected. It is not necessary to know the temporal address of each sensor within the array, as was the case hitherto in the context of time-division multiplexed arrays. It is sufficient to separate the sensors spatially, so that their responses do not overlap, possibly by inserting delay lines. The duration of the response of a 12-bit sensor is 120 ns if the pulse width is 10 ns, this being equivalent to a difference in optical path length, traversed by the light wave between two successive sensors, of twelve meters for an array operating by reflection.

However, if for any reason the sending unit and the receiving (acquisition) unit are remote from one another, the latter will be unable to determine the origin of the messages received, without copying the electrical pulses for controling the laser diodes at the level of the acquisition unit, this implying the running of an electric cable. Indeed, the latter unit cannot detect, in the stream of messages arriving at it, the one corresponding to the first sensor. It is therefore proposed to use a third wavelength, different from the first two, to provide a signal for triggering the array, as is illustrated by FIGS. 8, 8a-8c, 9, and 10a-10c and explained in detail below.

Figure 7:
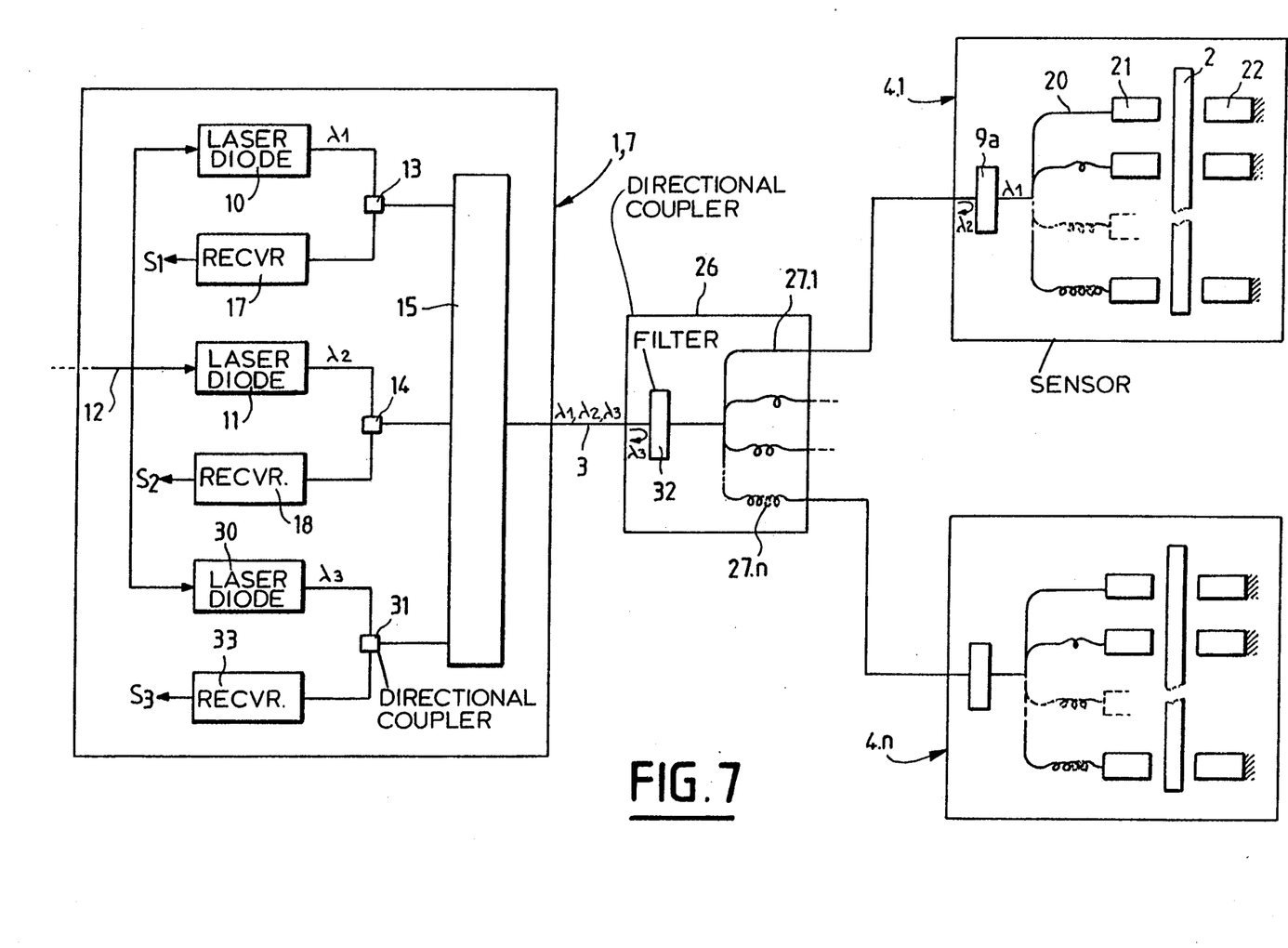
FIG. 7 is a schematic diagram of another illustrative embodiment of the device of the invention, in which a third wavelength serves as signal for triggering the array of sensors operating, in this case, by reflection.

The architecture of the device shown in FIG. 7, operating by reflection, is similar overall to that of the device of FIG. 5. Thus, in this figure are seen the laser diodes 10 and 11, generating light pulses at first λ1 and second λ2 wavelengths, the directional couplers 13 and 14, the multiplexer/demultiplexer 15, the receivers 17 and 18, the optical fiber 3, and the various sensors 4.1 to 4.n forming the array. As before, these latter are connected to the outputs of a coupler 26 with delay lines 27.1 to 27.n.

However, as indicated, in order to provide a signal for triggering the array and thus facilitate the control of the operation of the sensor array, the source 1 includes means of sending light pulses at a third wavelength λ3. These means may likewise consist of a multimode laser diode 30 driven in tempo with the laser diodes 10 and 11 so as to send light pulses at a third wavelength λ3 into the optical fiber 3 through a directional coupler 31 and the multiplexer/demultiplexer 15.

Furthermore, the coupler 26 is linked with means 32 for separating the light pulses at the third wavelength λ3 with respect to the light pulses at the first two wavelengths λ1 and λ2, so as to direct these latter to each sensor of the array and return the pulses at the third wavelength to the analysis means 7 in order to control the triggering of the array. These separating means comprise a filter 32 for reflecting the light pulses at the third wavelength λ3 into the fiber 3 towards the receiver 33, through the multiplexer/demultiplexer 15 and the directional coupler 31.

Moreover, it is clear that the analysis means can include means for monitoring the presence or absence of the pulses for triggering the array and/or the sensors, thus enabling a fault in the device to be located. Indeed, the use of different wavelengths makes it possible to locate the fault in a very simple and reliable manner, insofar as this locating is no longer affected by partial reflections of the pulses, from optical connectors for example. Such a possibility for locating a fault according to the invention can be illustrated as follows. If no triggering pulse is detected the faulty element is the common line; if one triggering pulse is lacking, the branch going from the distribution coupler to the associated sensor must be implicated; if the response from a sensor is systematically rejected even though the associated triggering pulse is detected, it is the sensor proper which is faulty.

Figure 8A:
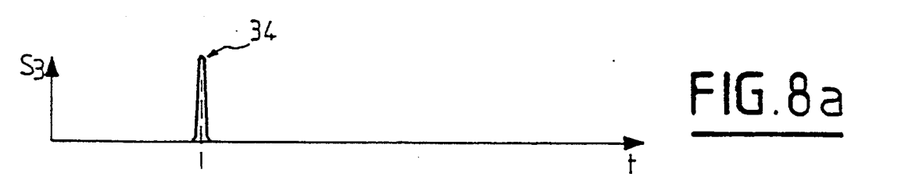
FIG. 8a, 8b and 8c are timing diagrams showing, respectively, the signal for triggering the array, the signals for triggering the sensors, and the measuring signals, obtained by implementing the device of FIG. 7.
Figure 8B:
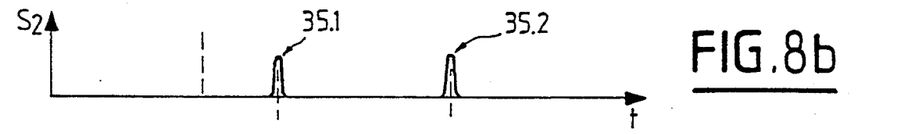
Figure 8C:
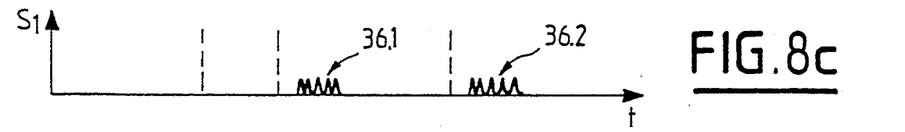

The timing diagrams of FIGS. 8a, 8b and 8c show, respectively, the array triggering signal 34, the sensor triggering signals 35.1, 35.2, . . . , and the corresponding measuring signals 36.1, 36.2.

Figure 9:
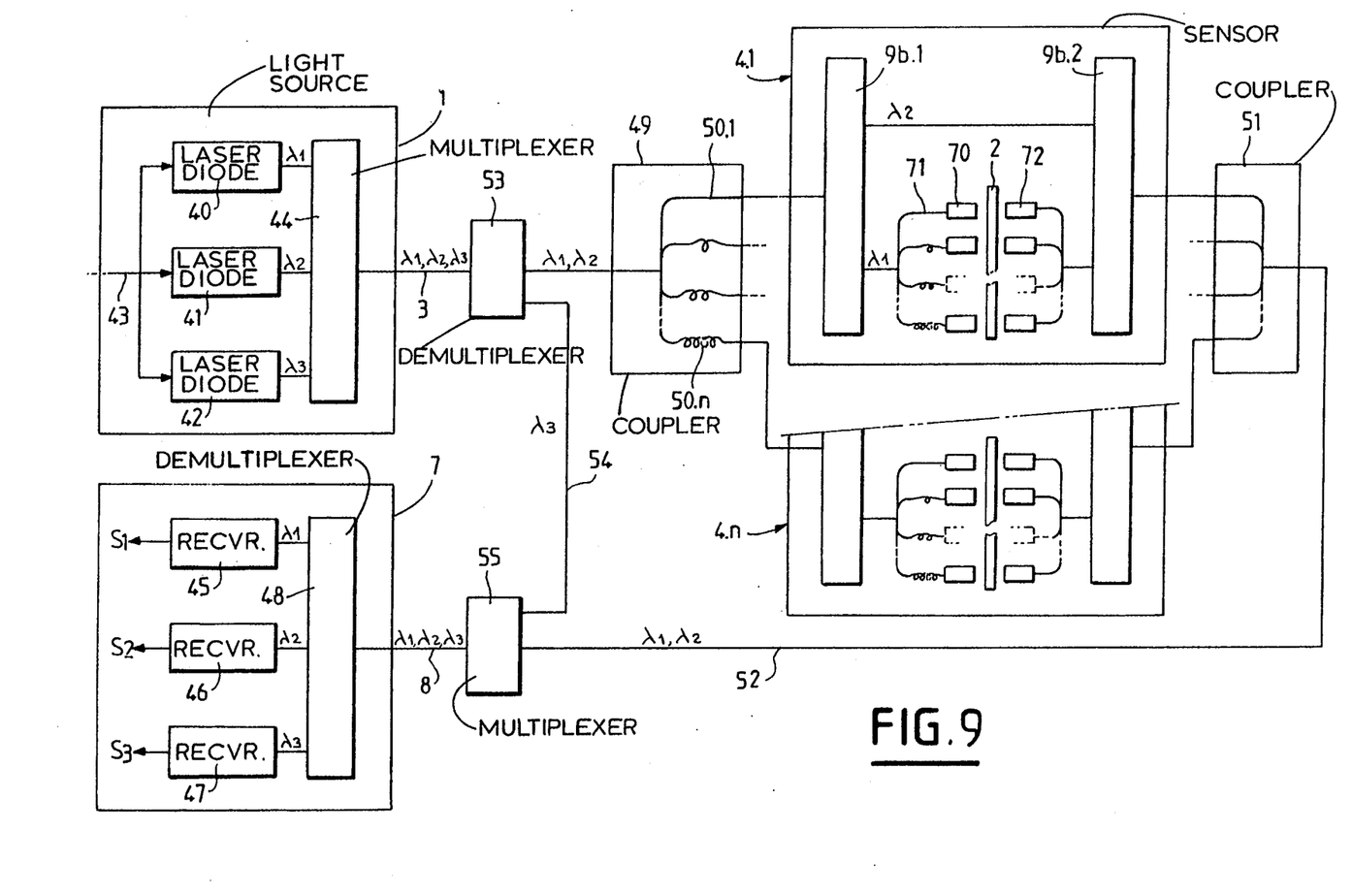
FIG. 9 is a schematic diagram, similar to FIG. 7, for an array of sensors operating by transmission.

FIG. 9 shows a device according to the invention operating by transmission and including a sensor array. In this case, the source 1 includes three laser diodes 40, 41, 42 supplied with electric current by the link 43 and emitting light pulses at three different wavelengths λ1, λ2 and λ3. The laser diodes 40, 41, 42 are connected to the multiplexer 44 to allow transmission of the light pulses by the optical fiber 3 towards the sensors 4.1 to 4.n. The output of the sensors 4.1 to 4.n is connected to the analysis means 7 by the optical fiber 8, these analysis means including receivers 45, 46 and 47 connected to the fiber 8 through the demultiplexer 48.

Each sensor 4.1 to 4.n may be such as described in regard to FIG. 1b (including, in particular, individual sending elements 70 with delay lines 71 and individual receiving elements 72), and the sensor array is arranged between, on the one hand, an input distribution coupler 49 with delay lines 50.1 to 50.n and, on the other hand, an output mixing coupler 51 connected, by an optical fibre 52, to the optical fibre 8.

Furthermore, there is provision for means for separating the pulses at the third wavelength (array triggering pulses) with respect to the pulses at the first two wavelengths (sensor triggering pulses and measuring pulses), consisting of means for diverting the pulses between the input of the distribution coupler 49 and the output of the mixing coupler 51 comprising, for example, a demultiplexer 53 at the input of the distribution coupler 49, an output of which delivers the pulses at the first two wavelengths to this coupler, and another output of which, delivering the pulses at the third wavelength λ3, is connected by an optical fiber 54 to an input of a multiplexer 55 receiving at another input the coded pulses (λ1,λ2) leaving the mixing coupler 51.

Figure 10A:
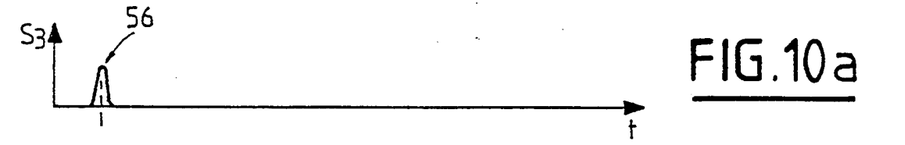
FIG. 10a, 10b and 10c are timing diagrams showing, respectively, the signal for triggering the array, the signals for triggering the sensors, and the measuring signals, obtained by implementing the device of FIG. 9.
Figure 10B:
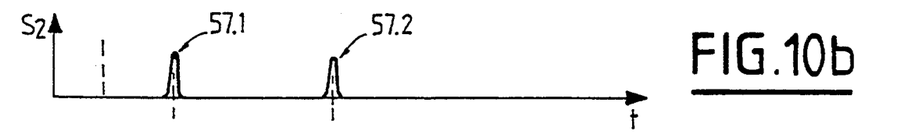
Figure 10C:
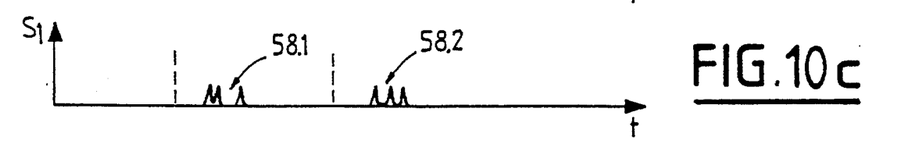

The timing diagrams of FIGS. 10a, 10b and 10c show, respectively, the array triggering signal 56, the sensor triggering signals 57.1, 57.2, . . . , and the corresponding measuring signals 58.1, 58.2.

It is therefore understood that, by employing pulses for triggering the sensors and possibly the array, it is possible to trigger the various acquisitions accurately, and that it is no longer necessary to know the precise temporal address of each sensor within the array, as is the case in the devices proposed in the state of the art in the context of time-division multiplexed arrays.

It is then sufficient to separate the various sensors spatially so that their responses do not overlap, possibly by inserting delay lines dependent on the duration of the response of each sensor.

The use of pulses at the third wavelength makes it possible to carry out synchronization at array level, enabling the problems of distance between the source and the analysis means to be solved.

As already indicated, rather than using a reflecting coding plate with the related disadvantages, it is preferable to use a mask operating by transmission, consisting, for example, of a metal plate drilled with holes in an arrangement conforming to a specified code, that is to say a mask containing regions which are opaque and regions which are transparent to said light pulses, said regions being arranged in a specified coding configuration. Thus, if the mask deforms and is no longer perpendicular to the light beams, the amplitude of the pulses and hence the binary error rate on each channel will not be impaired as much.

It goes without saying that the specified coding configuration may be a uniform binary code configuration enabling each position of the mask to be represented.

However, each position may likewise be represented by a GRAY code configuration which has a number of advantages by comparison with the binary code. Indeed, this representation has the advantage over the binary code of permuting just a single bit with each incrementation. Thus, for example, changing from position 7 to position 8 inverts the value of four bits in a conventional binary representation. In a GRAY code representation, the position coding changes from 0100 to 1100.

As the displacement of a mechanical part is in general relatively slow by comparison with the frequency of interrogation of the sensor, ambiguous situations may arise during these transitions, for which the power level on a binary channel corresponds neither to a high level nor to a low level.

Thus, changing from 7 to 8 will, in a conventional binary representation, impinge on four binary channels so that the case in which the associated means of analysis are mistaken on two channels or more and estimate for example that the position equals 0000 or 0001 is quite probable. Such a problem does not exist with a GRAY code configuration since the ambiguity appears on one channel only.

Moreover, it turns out that numerous applications require greater accuracy within a certain measurement range. It is then possible to use a configuration with non-uniform quantization, logarithmic for example, instead of uniform quantization, this making it possible to obtain greater accuracy over the desired measurement range with the same number of bits, that is to say position quantization levels.

Figure 11:
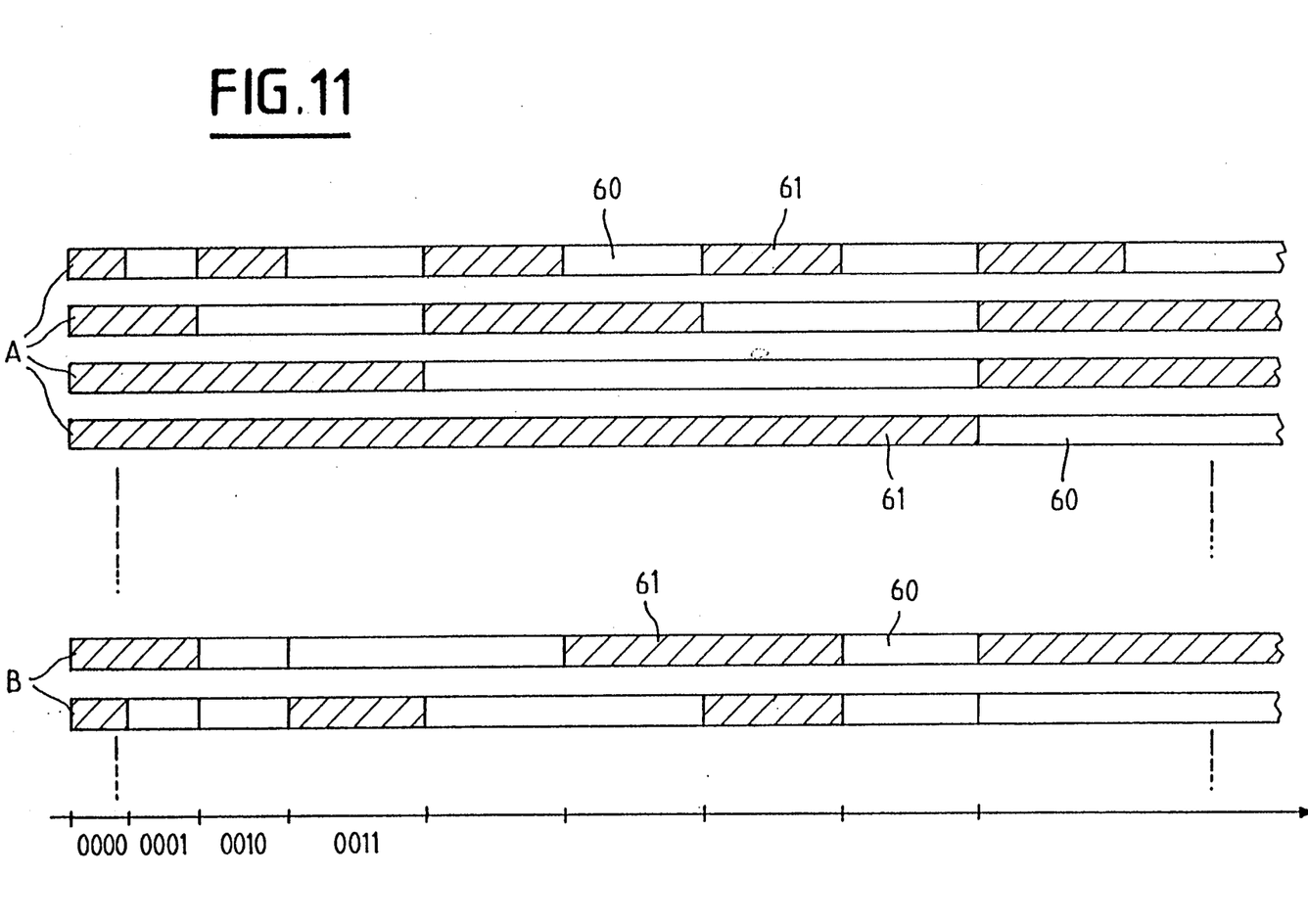
FIG. 11 shows an illustrative arrangement of the tracks with transparent and opaque regions of a mask used as coding means in the device according to the invention.

As can be seen in FIG. 11, the mask can include several tracks A for position coding, depending on the accuracy desired, each having regions which are successively opaque and transparent to the pulses, such as the regions denoted by the labels 60 and 61, respectively, in this figure.

It is also possible to associate with these position coding tracks A, parity coding tracks B associated with corresponding detection elements.

These parity tracks make it possible to generate a certain number of parity bits making it possible to monitor the correctness of the result and to correct an error, either random (arising for example from an incorrect decision by the analysis means associated with the sensor), or permanent (after dust for example appears on one of the position coding tracks).

If the mask includes for example eight position coding tracks A delivering, by way of the corresponding detection elements, eight position data bits, it is necessary to append at least four parity coding tracks B allowing delivery of four parity bits, so as to be able to correct one error and detect two of them. In order to increase the correction capability, the number of bits and hence of parity coding tracks must be increased.

Calculation of these bits can be carried out as follows.

$$(p_1 - p_4) = (d_1 - d_8) \begin{pmatrix} 1 & 1 & 0 & 0 \\ 1 & 0 & 1 & 0 \\ 1 & 0 & 0 & 1 \\ 0 & 1 & 1 & 0 \\ 0 & 1 & 0 & 1 \\ 0 & 0 & 1 & 1 \\ 1 & 1 & 1 & 0 \\ 1 & 1 & 0 & 1 \end{pmatrix}$$

where
($p_1$-$p_4$): parity bits
($d_1$-$d_8$): data bits
Of course, other matrices may be used.

In such a case, each position of the sensor therefore corresponds to a word of twelve bits, including eight for position data and four for parity. It can then be verified that the HAMMING distance related to this class of code is three (necessary and sufficient condition for correcting one error and detecting two of them). It is therefore possible to monitor the changes in the sensor and, if two or more errors appear permanently, it may be assumed that at least two of the channels have been lost, and replacement of the corresponding sensor must then be envisaged.

The use of the sensor may be devised for industrial applications requiring measurements of displacements while exhibiting good resolution around small values of position and good resistance to vibrations and to any pollution due to the outside environment. These characteristics make it possible to limit the effects due to the impairment of the sensor consecutive upon for example the introduction of dust and the loss of a coding track.

It is of course understood that, apart from position and displacement, any physical quantity, changes in the value of which may be represented directly or indirectly by a displacement or a rotation of the sensor(s) can be measured with the device of the invention.

We claim:

1. A device for measuring a physical quantity by time-division coding, comprising:
   a source capable of generating light pulses;
   means of coding, the position of which depends on the value of said physical quantity;
   first means of transmitting said light pulses from said source to at least one sensor;
   said sensor comprising means for sending said light pulses to said coding means, located at the end of said first transmission means opposite said coding means, and means of receiving the coded light pulses; and means of analyzing the coded light pulses, connected to said sensor by second transmission means, wherein said source (1) is capable of generating light pulses simultaneously at at least two different wavelengths ($\lambda 1$, $\lambda 2$), and wherein the sensor (4) is associated with first means (9a; 9b) of separating the light pulses on the basis of their wavelength, located upstream of said sending (5) and receiving (6) means, the light pulses at a first wavelength ($\lambda 1$) passing through said sensor (4) and being coded before being returned to the analysis means (7), while the light pulses at a second wavelength ($\lambda 2$) are returned to the analysis means (7) before reaching the coding means (2) for the purpose of constituting pulses for triggering the sensor.

2. The device as claimed in claim 1, wherein said first (3) and second (8) transmission means consist of optical fibers.

3. The device as claimed in claim 1, wherein said means for sending (5) and for receiving (6) the light pulses consist of a plurality of pairs of individual elements for sending (21) and for receiving (22), the elements of each pair being located opposite one another and on either side, respectively, of said coding means (2), and being connected to said first transmission means (3) by delay lines via a coupler.

4. The device as claimed in claim 3, wherein the individual receiving elements (22) are adapted to reflect the coded light pulses and return them to the analysis means (7) through the corresponding sending elements (21).

5. The device as claimed in claim 4, wherein said first means for separating the light pulses on the basis of their wavelength consist of a filter (9a) allowing through the light pulses at the first wavelength ($\lambda 1$), but reflecting the light pulses at the second wavelength ($\lambda 2$) towards the analysis means (7).

6. The device as claimed in claim 3, wherein the individual receiving elements are adapted to transmit the coded light pulses to the analysis means (7) via said second transmission means (8).

7. The device as claimed in claim 6, wherein said first means for separating the light pulses on the basis of their wavelength consist of means for diverting (9b) the light pulses at the second wavelength ($\lambda 2$) between the input and the output of the sensor (4).

8. The device as claimed in claim 7, wherein the diverting means (9b) comprise a wavelength demultiplexer (9b.1), stationed at the input of the sensor (4) and an output of which delivers the pulses at the first wavelength ($\lambda 1$) passing through the sensor (4) and the other output of which, delivering the pulses at the second wavelength ($\lambda 2$), is connected to an input of a wavelength-division multiplexer (9b.2) receiving, at its other input, the coded pulses at the first wavelength ($\lambda 1$).

9. The device as claimed in claim 1, including an array of a plurality of sensors, wherein said source (1) is capable of generating light pulses at a third wavelength ($\lambda 3$), and wherein second means (32; 53, 55) of separating the light pulses on the basis of their wavelength are provided, upstream of said sensors (4.1 to 4.n), in order to return the light pulses at the third wavelength ($\lambda 3$) to said analysis means (7) for the purpose of constituting pulses for triggering the array and allowing through the light pulses at the first two wavelengths ($\lambda 1$, $\lambda 2$).

10. The device as claimed in claim 9, wherein the plurality of sensors (4.1 to 4.n) are connected in parallel to the outputs of a coupler (26) via delay lines, and wherein said coupler (26) is associated with a filter (32) for reflecting the pulses at the third wavelength ($\lambda 3$), constituting said second separating means.

11. The device as claimed in claim 9, wherein the plurality of sensors (4.1 to 4.n) are connected in parallel between an input distribution coupler (49) via delay lines and an output mixing coupler (51), said couplers being associated with means (53, 55) for diverting the light pulses at the third wavelength ($\lambda 3$) between the input of the distribution coupler (49) and the output of the mixing coupler (51), constituting said second separating means.

12. The device as claimed in claim 11, wherein said diverting means comprise a wavelength demultiplexer (53), at the input of the distribution coupler (49), an output of which delivers the light pulses at the first two wavelengths ($\lambda 1$, $\lambda 2$) to said distribution coupler (49), and another output of which, delivering the light pulses at the third wavelength ($\lambda 3$), is connected, downstream of the mixing coupler (51), to an input of a wavelength-division multiplexer (55) receiving at another input the coded light pulses and the light pulses for triggering the sensors, delivered by the mixing coupler (51).

13. The device as claimed in claim 1, wherein the source (1) capable of generating light pulses comprises multimode laser diodes.

14. The device as claimed in claim 1, wherein the source (1) capable of generating light pulses and the analysis means (7) are associated, respectively, with means for multiplexing and with means for demultiplexing the light pulses at the various wavelengths.

15. The device as claimed in claim 1, wherein the analysis means (7) are capable of locating a fault in the device by monitoring the presence or absence of triggering pulses.

16. The device as claimed in claim 1, wherein each sensor (4) is a position or displacement sensor.

17. The device as claimed in claim 1, wherein the coding means (2) stationed between said sending means (5) and said receiving means (6) consist of a mask containing regions (61) which are opaque and regions (60) which are transparent to said light pulses, said regions being located in a specified coding configuration.

18. The device as claimed in claim 17, wherein said mask (2) includes position coding tracks (A) and parity coding tracks (B), each including opaque regions and transparent regions.

19. The device as claimed in claim 17, wherein the coding configuration is a binary code configuration.

20. The device as claimed in claim 17, wherein the coding configuration is a GRAY code configuration.

21. The device as claimed in claim 17, wherein the coding configuration exhibits uniform quantization.

22. The device as claimed in claim 17, wherein the coding configuration exhibits logarithmic quantization.

* * * * *

UNITED STATES PATENT AND TRADEMARK OFFICE
CERTIFICATE OF CORRECTION

PATENT NO. : 5,408,091
DATED : April 18, 1995
INVENTOR(S) : PERRAUD ET AL.

It is certified that error appears in the above-identified patent and that said Letters Patent is hereby corrected as shown below:

Column 2, line 15, "at least two" should be --at at least two--.

Column 3, line 68 - Column 4, line 1, "for 10 receiving" should be --for receiving--.

Signed and Sealed this

Seventeenth Day of October, 1995

Attest:

BRUCE LEHMAN

Attesting Officer

Commissioner of Patents and Trademarks